US010595203B2

(12) United States Patent
Dong

(10) Patent No.: US 10,595,203 B2
(45) Date of Patent: Mar. 17, 2020

(54) ENHANCED ESTABLISHMENT OF IMS SESSION WITH SECURE MEDIA

(71) Applicant: Telefonaktiebolaget LM Ericsson (publ), Stockholm (SE)

(72) Inventor: Huoming Dong, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 231 days.

(21) Appl. No.: 15/535,791

(22) PCT Filed: Jan. 21, 2015

(86) PCT No.: PCT/CN2015/071203
§ 371 (c)(1),
(2) Date: Jun. 14, 2017

(87) PCT Pub. No.: WO2016/115694
PCT Pub. Date: Jul. 28, 2016

(65) Prior Publication Data
US 2017/0339565 A1 Nov. 23, 2017

(51) Int. Cl.
*H04W 12/08* (2009.01)
*H04L 29/06* (2006.01)
*H04W 12/06* (2009.01)

(52) U.S. Cl.
CPC .......... *H04W 12/08* (2013.01); *H04L 65/103* (2013.01); *H04L 65/1016* (2013.01);
(Continued)

(58) Field of Classification Search
CPC ...... H04W 12/08; H04W 12/06; H04L 65/10; H04L 65/1016; H04L 65/103;
(Continued)

(56) References Cited

U.S. PATENT DOCUMENTS 9,143,504 B1 * 9/2015 Shi .................. H04L 63/0823
2004/0008681 A1 1/2004 Govindarajan et al.
(Continued)

FOREIGN PATENT DOCUMENTS

CN 101001441 A 7/2007
CN 101370004 A 2/2009
(Continued)

OTHER PUBLICATIONS

C. Holmberg, et al., Connection Establishment for Media Anchoring (CEMA) for the Message Session Relay Protocol (MSRP), Internet Engineering Task Force (IETF), Standard, Internet Society (ISOC) 4, Rue Des Falaises Ch-1205 Geneva, Switzerland, Aug. 25, 2012, pp. 1-22, XP015086420.
(Continued)

*Primary Examiner* — Khalil Naghdali
*Assistant Examiner* — Shaqueal D Wade
(74) *Attorney, Agent, or Firm* — Coats + Bennett, PLLC

(57) ABSTRACT

A method of establishing a secure connection between a user equipment, UE, and a media gateway, MGw, at setup of a communication session between the UE and another party. The MGw is controlled by a control server and the setup of the communication session comprises a security handshake procedure. The method comprising, prior to receiving a communication session set-up request, determining by the control server whether the MGw supports a procedure for early commencement of the security handshake and providing by the UE to the control server an indication that the UE supports the procedure for early commencement of the security handshake procedure and connection parameters for use in the security handshake. On receiving, by the control server, a communication session setup request from the other party, if both the UE and the MGw support the procedure for early commencement of the security hand-
(Continued)

shake procedure, an instruction is sent to the Media gateway to commence the security handshake procedure. The instruction comprises an indication to commence an early security handshake and the connection parameters for the UE. On receipt of the instruction, the MGw commences the security handshake (25) with the UE and establishes a secure communications session.

20 Claims, 14 Drawing Sheets

(52) U.S. Cl.
 CPC ......... *H04L 65/1069* (2013.01); *H04W 12/06* (2013.01); *H04L 63/08* (2013.01); *H04L 63/20* (2013.01); *H04L 65/1006* (2013.01); *H04L 65/608* (2013.01)

(58) Field of Classification Search
 CPC ..... H04L 65/1069; H04L 9/3263–3268; H04L 63/0823; H04L 63/08–0892; H04L 63/20
 See application file for complete search history.

(56) References Cited

U.S. PATENT DOCUMENTS

| | | |
|---|---|---|
| 2007/0189268 A1 | 8/2007 | Mitra et al. |
| 2010/0049973 A1 | 2/2010 | Chen |
| 2012/0198068 A1* | 8/2012 | Xie .................... H04L 65/1016 709/226 |
| 2013/0120519 A1* | 5/2013 | Jin .................... H04W 36/0022 348/14.02 |
| 2013/0254531 A1* | 9/2013 | Liang .................... H04L 63/164 713/151 |
| 2015/0101028 A1* | 4/2015 | Kruse .................. H04L 63/205 726/4 |

FOREIGN PATENT DOCUMENTS

| | | |
|---|---|---|
| EP | 1924032 A1 | 5/2008 |
| WO | 2016033764 A1 | 3/2016 |

OTHER PUBLICATIONS

M. Westerlund, et al., Options for Securing RTP Sessions draft-ietf-avtcore-rtp-security-options-10, Network Working Group, Internet Draft, Informational, Internet Society (ISOC) 4, Rue Des Falaises Ch-1205 Geneva, Switzerland, Jan. 15, 2014, pp. 1-35, XP015098015.

3rd Generation Partnership Project, "Technical Specification Group Services and System Aspects; IP Multimedia Subsystem (IMS) media plane security (Release 11)", 3GPP TR 33.828 V11.1.0, Sep. 2012, pp. 1-81.

3rd Generation Partnership Project, "Technical Specification Group Services and System Aspects; IP Multimedia Subsystem (IMS) media plane security (Release 12)", 3GPP TS 33.328 V12.7.0, Jun. 2014, pp. 1-71.

Fischl, J. et al., "Framework for Establishing a Secure Real-time Transport Protocol (SRTP) Security Context Using Datagram Transport Layer Security (DTLS)", Internet Engineering Task Force (IETF), Request for Comments: 5763, Category: Standards Track, ISSN: 2070-1721, May 2010, pp. 1-38.

Mcgrew, D. et al., "Datagram Transport Layer Security (DTLS) Extension to Establish Keys for the Secure Real-time Transport Protocol (SRTP)", Internet Engineering Task Force (IETF), Request for Comments: 5764, Category: Standards Track, ISSN: 2070-1721, May 2010, pp. 1-27.

* cited by examiner

ENHANCED ESTABLISHMENT OF IMS SESSION WITH SECURE MEDIA

TECHNICAL FIELD

The technical field of the invention is the establishment of secure multimedia sessions in a communications network.

BACKGROUND

Security is always one of the most important aspects of communication. Security leaks may damage personal or corporate properties like intellectual property, business secrets, personal privacy, account credentials, etc. In IMS (IP Multimedia Subsystem), communication security is usually realized by using secured media streams.

SRTP (Secure Real-Time Transfer Protocol) is commonly used as media transport protocol to secure the RTP/RTCP (Real-Time Transfer Protocol/Real-Time Transfer Control Protocol) media streams between a UE (User Equipment) and aMGw (Media GateWay). However, SRTP does not provide key management functionality, but instead depends on external key management functions to exchange secret master keys, and to negotiate the algorithms and parameters for use with those keys. DTLS-SRTP (Datagram Transport Layer Security—Secure Real-Time Transfer Protocol) is an ideal combination which provides the performance and encryption flexibility benefits of SRTP using DTLS-integrated key and association management. DTLS keying happens on the media path, independent of any out-of-band signalling channel.

For DTLS-SRTP, the DTLS handshake between UE and MGw is used to negotiate and agree keying material, algorithms, and parameters for SRTP. However, DTLS needs certificate fingerprints from both MGw and UE. DTLS certificate fingerprints and setup attributes are exchanged via SDP (Session Description Protocol) Offer/Answer between the UE and a Control Server or SBC (Session Border Controller). The UE fingerprint and setup attributes are provided to the MGw over an ITU-T H.248 protocol. In the return direction, the MGw fingerprint and setup attributes are provided to the CONTROL SERVER over the ITU-T H.248 protocol and are then forwarded to the UE. Once certificate fingerprints and setup attributes are successfully exchanged, DTLS negotiation can be initiated in order to start the SRTP based secured media stream.

In addition to the security handshake required when a UE accesses a network to initiate a communications session, a security handshake is also required to enable a secure connection to be set up between an MGw and a UE receiving the set-up request. Such an arrangement is illustrated in FIG. 1, which is a schematic diagram of a section of a network (1) in which a UE receives a communication session set-up request. The network comprises a UE (2), which communicates with a control server or Session Border Controller (SBC) (3) in the signalling domain (8) and with a Media Gateway, MGw (4), in the user or media domain (7). Signalling (9) from the Control Server is transmitted to the IP Media Subsystem (IMS) Core (5).

Typically, the Session Initiation protocol is used for signalling (8, 9), but other signalling methods may be used, such as H323. The Control Server (3) controls the MGw, by means of a signalling link (10). Typically, the H248 protocol is used. A remote party (6) may connect with the IMS in order to establish a communication session with UE (2).

FIG. 2 is a signalling diagram which shows a method of establishing an SRTP communication session using a DTLS-SRTP handshake procedure. The session setup starts with a connection setup request message (11), typically a Session Initiation Protocol (SIP) INVITE message, which includes in Session Description Protocol (SDP) format a request for a secure connection based on Datagram Transport Layer Securit-Secure Real Time Protocols (DTLS-SRTP) handshake procedure. The setup request is received at the Control Server (3), which creates a message, typically using the H248 protocol to signal to the MGw that the establishment of a media session is required (12). This message is received by the MGw(4) and the MGw responds typically with an ADD reply (13). This response contains the MGw fingerprint. The fingerprint is received by the Control Server (3) and then forwarded (14) to the UE (2). The UE responds (15) with a message containing its own fingerprint (15). Typically this message is in SDP format. The UE fingerprint is typically transferred to the MGw in an H248 Modify message (16). The MGw responds with a reply (17). At this stage, both the UE and the MGw have each other's fingerprints. The handshake procedure (19) now takes place, in which certificates are provided and validated using the fingerprints. Once the handshake is completed, an SRTP session (20) is set up.

In practice DTLS negotiation takes some time to complete, prolonging the overall session set-up time. In a typical IMS system, DTLS negotiation may take up to several seconds, leading to a very bad user experience and potentially harming the operator's reputation.

SUMMARY OF THE INVENTION

According to a first aspect of the invention, there is provided a method of establishing a communication session between a user equipment(UE) and another party, by way of a Media Gateway (MGw)controlled by a Control Server. The communications session comprises a secure connection between the UE and the MGw and the setup of the secure connection comprises a security handshake procedure. The method comprises, prior to receiving a communication session set-up request at the Control Server, determining and recording by the control server whether the MGw supports a procedure for early commencement of the security handshake and providing by the UE to the control server an indication that the UE supports the procedure for early commencement of the security handshake procedure and connection parameters for use in the security handshake. The indication and connection parameters are stored by the Control Server. On receiving, by the control server, a communication session setup request from the other party, if the UE has provided an indication that it supports the procedure and its connection parameters, and the Control Server has determined that the MGw supports the procedure for early commencement of the security handshake procedure, an instruction is sent to the Media gateway to commence the security handshake procedure. The instruction comprises an indication to commence an early security handshake and the connection parameters for the UE. On receipt of the instruction, the MGw commences the security handshake with the UE and establishes a secure communications session.

Preferably, the security handshake comprises an exchange of authentication certificates between the UE and the MGw, and the method further comprises tentative acceptance of the authentication certificates, exchange between the UE and the MGw of respective fingerprints derived from the respective authentication certificates and validation of the respective authentication certificates by the UE and the MGw using the respective fingerprints.

Preferably the method further comprises terminating the set-up of the communication session if the validation of either security certificate fails.

Preferably the security handshake comprises a Datagram Transport Layer Security (DTLS) handshake.

Preferably the communication session uses Secure Real Time Protocol.

Preferably the communication session signaling is sent by means of the Session

Initiation protocol (SIP).

Preferably the UE supplies the indication and the connection parameters by means of a SIP REGISTER message.

Preferably the determining by the control server whether the MGw supports a procedure for early commencement of the security handshake is performed during a ROOT audit.

Preferably the instruction to commence the security handshake procedure and the UE connection parameters are sent by means of an H248 protocol message.

In a second aspect of the present invention, there is provided an apparatus for use in user equipment, UE, in a communications network, the apparatus comprising processor circuitry, a storage unit for storing instructions executable by the processor circuitry, whereby the apparatus is operative to, prior to receiving a communication session set-up request, provide to the control server an indication that the UE supports a procedure for early commencement of a security handshake and connection parameters for use in the security handshake. The apparatus is further configured to, on receiving from a Media Gateway, MGw, an initialization of a security handshake, commence the security handshake and establish a secure communications session.

In a third aspect of the present invention, there is provided an apparatus for use in a Control Server for a Media Gateway (MGw), in a communications network, the apparatus comprising processor circuitry a storage unit for storing instructions executable by the processor circuitry, whereby the apparatus is operative to receive from a UE an indication that the UE supports a procedure for early commencement of a security handshake and connection parameters for use in the security handshake, store the indication and connection parameters, determine and record whether an MGw supports the procedure for early commencement of the security handshake, and on receipt of a communication session setup request from another party, determine that the UE and the MGw support the procedure for early commencement of the security handshake. The apparatus is further configured, if the UE has provided an indication that it supports the procedure and connection parameters, and the Control Server has determined that MGw supports the procedure, to send to the MGw the connection parameters of the UE and an instruction to commence the handshake procedure.

In a fourth aspect of the present invention there is provided an apparatus for use in a Media Gateway (MGw) in a communications network, the apparatus comprising processor circuitry and a storage unit for storing instructions executable by the processor circuitry, whereby the apparatus is operative to, prior to an initialization of a communication session, provide an indication to the Control Server that the MGw supports a procedure for early commencement of the security handshake, and, on receiving an instruction from the Control Server and connection parameters for a UE, commence an early handshake procedure with the UE using the provided connection parameters.

In a fifth aspect of the present invention there is provided a system comprising a User Equipment (UE) comprising apparatus according to the second aspect of the invention, a Control Server comprising according to the third aspect of the invention and a Media Gateway (MGw) comprising apparatus according to the fourth aspect of the invention.

In a sixth aspect of the present invention there is provided a method of operating a User Equipment (UE) in a communications network comprising a Media gateway (MGw) and a Control Server. The method comprises, prior to receiving a communication session set-up request, providing to the Control Server an indication that the UE supports a procedure for early commencement of a security handshake and connection parameters for use in the security handshake. The method further comprises, on receiving from a Media Gateway, MGw, an initialization of a security handshake, commencing the security handshake and establishing a secure communications session.

In a seventh aspect of the present invention there is provided a method of operating a Control Server for a Media Gateway (MGw) in a communications network comprising a User Equipment (UE) and an MGw. The method comprises, prior to receiving a set-up request to establish a communication session at the control server, determining whether the MGw supports a procedure for early commencement of the security handshake, receiving from the UE an indication that the UE supports the procedure for early commencement of the security handshake procedure and connection parameters for use in the security handshake, and storing the indication and the connection parameters. The method further comprises, on receiving a set-up request to establish a communication session from another party, if both the UE and the MGw support the procedure for early commencement of the security handshake procedure, sending an instruction to the MGw to commence the security handshake procedure, the instruction comprising the connection parameters for the UE.

In an eighth aspect of the present invention there is provided a method of operating a Media Gateway (MGw) in a communications network comprising a User Equipment (UE) and an MGw. The method comprises, prior to an initialization of a communication session, providing an indication to the Control Server that the MGw supports a procedure for early commencement of the security handshake. The method further comprises, on receiving an instruction from the Control Server and connection parameters for a UE, commencing an early handshake procedure with the UE using the provided connection parameters.

In a ninth aspect of the present invention there is provided a computer program, comprising instructions which, when executed on at least one processor, cause the at least one processor to carry out a method according to the first, sixth, seventh or eighth aspects of the invention.

In a tenth aspect of the present invention, there is provided a computer program product comprising a computer program according to the ninth aspect of the invention.

In an eleventh aspect of the present invention, there is provided a carrier containing the computer program product according to the tenth aspect of the invention, wherein the carrier optionally includes an electrical signal, an optical signal, a radio signal, a magnetic tape or disk, an optical disk or a memory stick.

BRIEF DESCRIPTION OF THE DRAWINGS

The above and other aspects of the present invention will now be described by way of example only, with reference to the following figures.

DETAILED DESCRIPTION

Figure 1:
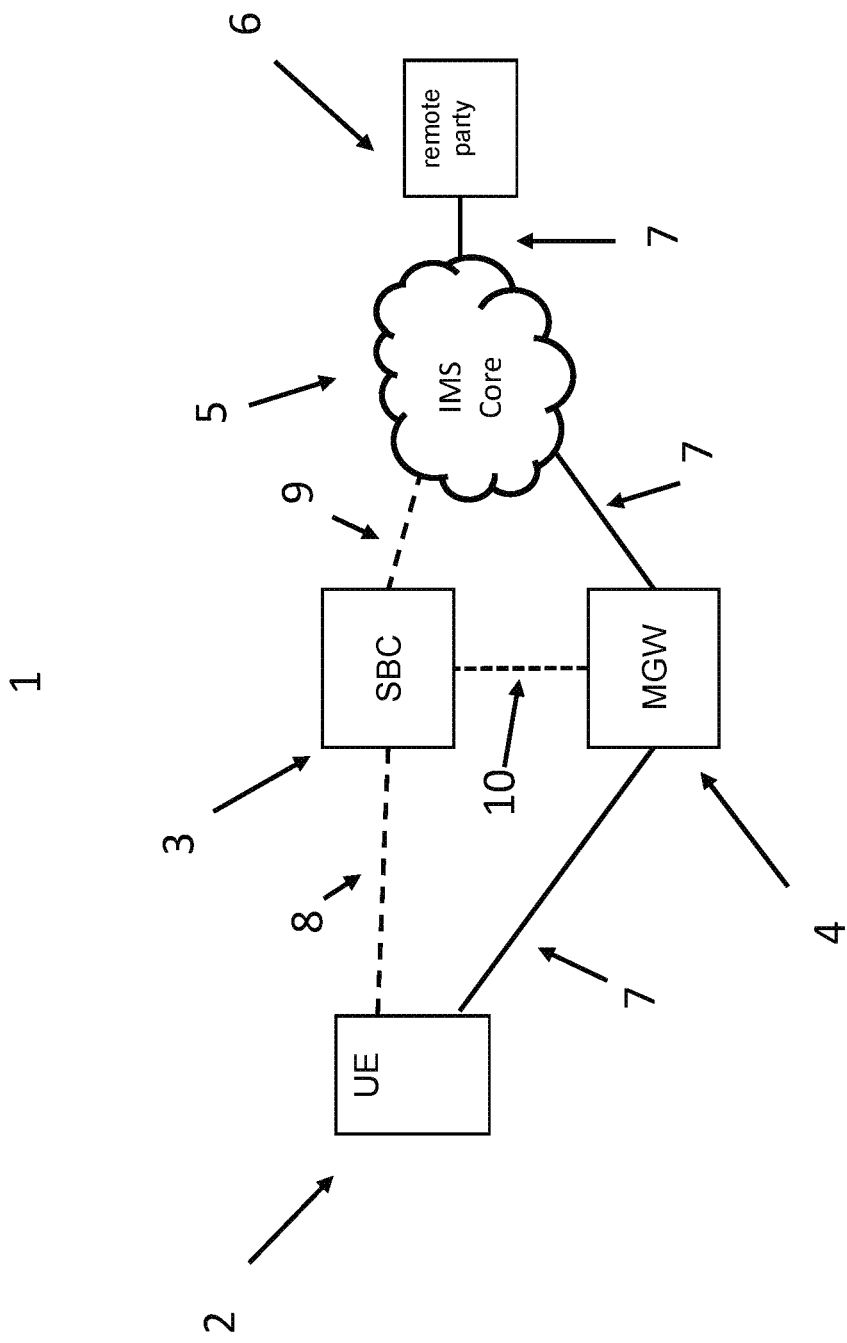
FIG. 1 is a schematic view of a typical network on which the present invention may be implemented.
Figure 2:
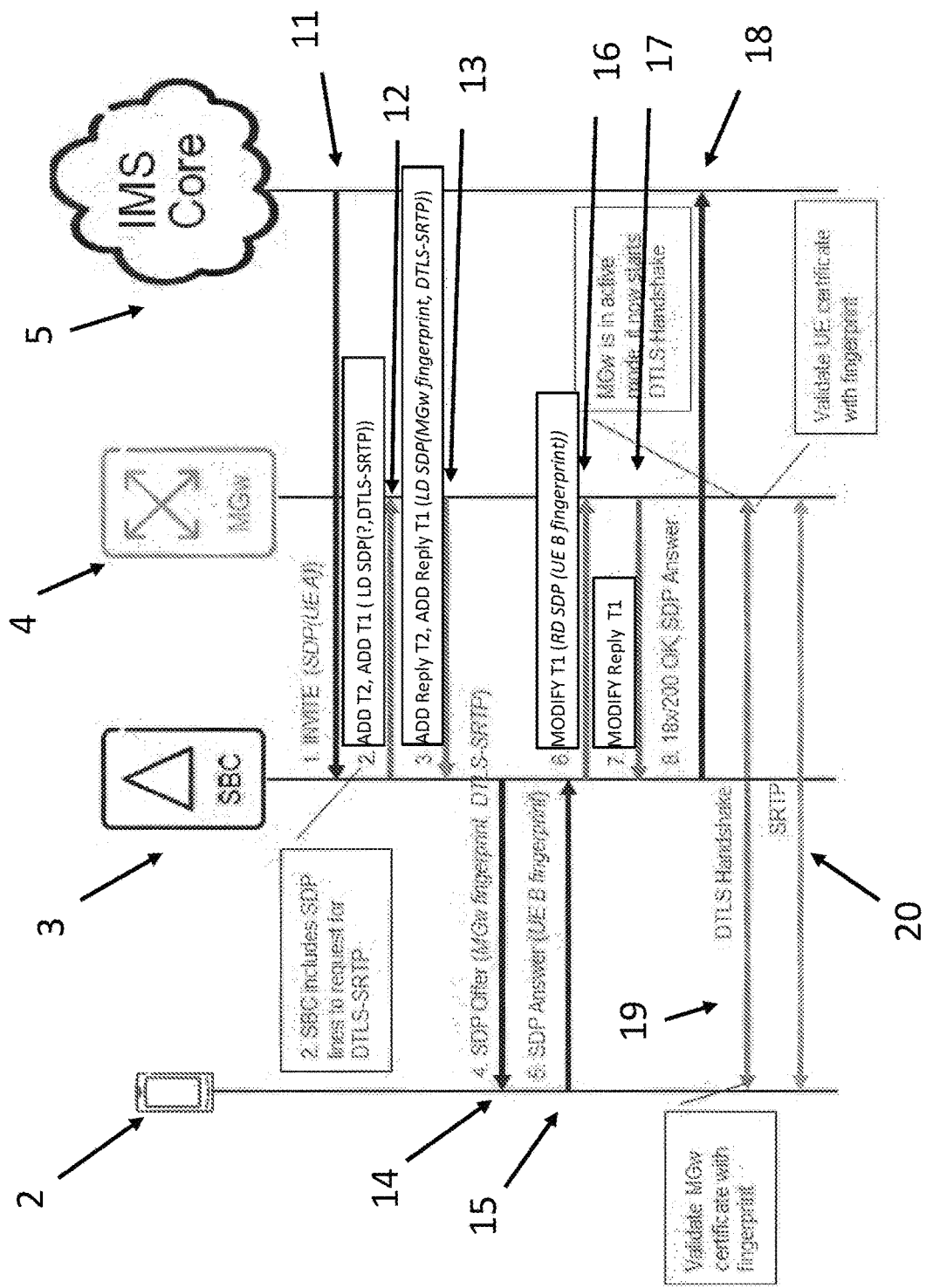
FIG. 2 is a signalling diagram for the set-up of a Secure Real Time Protocol (SRTP) based session using a Datagram Transport Layer Security (DTLS) handshake.

In the following, the system, method, node and computer program for establishment of a secure connection between the user equipment and the media gateway at setup of the communication session with the remote party according to the invention are described in more detail.

Within the context of the present application, the term "User Equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with automated systems such as monitoring systems with operate without human intervention.

Within the context of the present application, the term "Control Server" refers to a Server primarily performing control procedures for sessions or calls and services of a subscriber of the communication network. The term typically refers to those entities of the communication network handling control plane, subscriber data, services, or signalling traffic associated with user traffic in the communication network. In a core network a control node may be a MSC (Mobile Switching Centre), MME (Mobility Management Entity), SGSN (Serving Gateway Support Node), Control Server (Session Border Controller), P-CSCF (Proxy Call Session Control Function), S-CSCF (Serving-CSCF), or TAS (Telephony Application Server) node. Several of those control node entities may be co-located in a single physical node, for example a SBC/P-CSCF combination, combining the IMS Core border control with the proxy session control function of IMS.

Within the context of the present application, the term "security certificate" may particularly refer to an electronic document that may bind a public key with an identity. An identity may herein be, for example, information such as a name of a person, an organization, or a network node or a user equipment. For example, the security certificate can be used to verify that a public key belongs to a network node. Security certificates are issued by a trusted Certificate Authority (CA), which is typically situated in a Network Management Systems (NMS) of the communication network. The electronic document forming a digital certificate may, for example, comprise information such as:

- a serial number to uniquely identify the digital certificate;
- a subject which corresponds to an entity identified.
- a signature algorithm which is used to create the signature.
- a signature which is the actual information used to verify that the digital certificate came from the issuer.
- an issuer of the certificate, which corresponds to the entity that verified the information and issued the digital certificate;
- a date from the digital certificate is first valid, with the latter date being also referred to "valid-from"; and/or
- an expiration date of the digital certificate which can be also referred to as "valid-to".

A network element or a UE has typically one digital certificate. Further information on security certificates can also be found in ITU-T X.509 standard for a public key infrastructure and a privilege management infrastructure.

Within the context of the present application, the term "fingerprint" may particularly refer to a short sequence of bytes used to authenticate or look up a longer public key. Fingerprints are created by applying a cryptographic hash function to a public key or a security certificate. Since fingerprints are shorter than the keys they refer to, they can be used to simplify certain key management tasks. Fingerprints may also be referred to by the term "thumbprint" instead. A security certificate fingerprint is typically created through the following steps:

A security certificate (and optionally some additional data) is encoded into a sequence of bytes. To ensure that the same fingerprint can be recreated later, the encoding must be deterministic, and any additional data must be exchanged and stored alongside the security certificate. The additional data is typically information which anyone using the security certificate should be aware of. Examples of additional data include: which protocol versions the key should be used with and the name of the key holder (in the case of X.509 trust anchor fingerprints, where the additional data consists of an X.509 self-signed certificate).

The data produced in the previous step is hashed with a cryptographic hash function such as MD5 or SHA-1.

If desired, the hash function output can be truncated to provide a shorter, more convenient fingerprint.

This process produces a short fingerprint which can be used to authenticate a much larger security certificates. When displayed for human inspection, fingerprints are usually encoded into hexadecimal strings. These strings are then formatted into groups of characters for readability.

The term "Datagram Transport Layer Security" (DTLS) for SRTP refers to an extension of DTLS to establish keys for Secure RTP (SRTP) and Secure RTP Control Protocol (SRTCP) flows. DTLS keying happens on the media path, independent of any out-of-band signalling channel (see IETF RFC 5764). DTLS (see IETF RFC4347) is a channel security protocol that offers integrated key management, parameter negotiation, and secure data transfer. Because DTLS data transfer protocol is generic, it is less highly optimized for use with RTP than is SRTP, which has been specifically tuned for that purpose. DTLS-SRTP is a SRTP extension for DTLS that combines the performance and encryption flexibility benefits of SRTP with the flexibility and convenience of DTLS-integrated key and association management. DTLS-SRTP can be viewed in two equivalent ways: as a new key management method for SRTP, and a new RTP-specific data format for DTLS. Within the context of the present application, DTLS-SRTP is used as an example for scenarios which use SDP for certificate fingerprint and setup attributes exchange, and where this information is used to negotiate the encryption key with a media path handling node via a dedicated procedure, like DTLS handshake, before a media connection can be used. The key points of DTLS-SRTP are that:

application data is protected using SRTP,
the DTLS handshake is used to establish keying material, algorithms, and parameters for SRTP,
a DTLS extension is used to negotiate SRTP algorithms, and
other DTLS record-layer content types are protected using the ordinary DTLS record format.

DTLS negotiation usually takes some time to complete which prolongs the overall call setup lead-time. On a typical IMS system, DTLS negotiation can take several seconds which introduce very bad user experience.

Ideally, the MGw shall start the DTLS negotiation with the UE immediately upon receiving the DTLS-SRTP request from the Control Server. In prior art solutions however this is not possible before the Control Server receives the SDP Answer from UE and forwards the SDP to the MGw.

Figure 3:
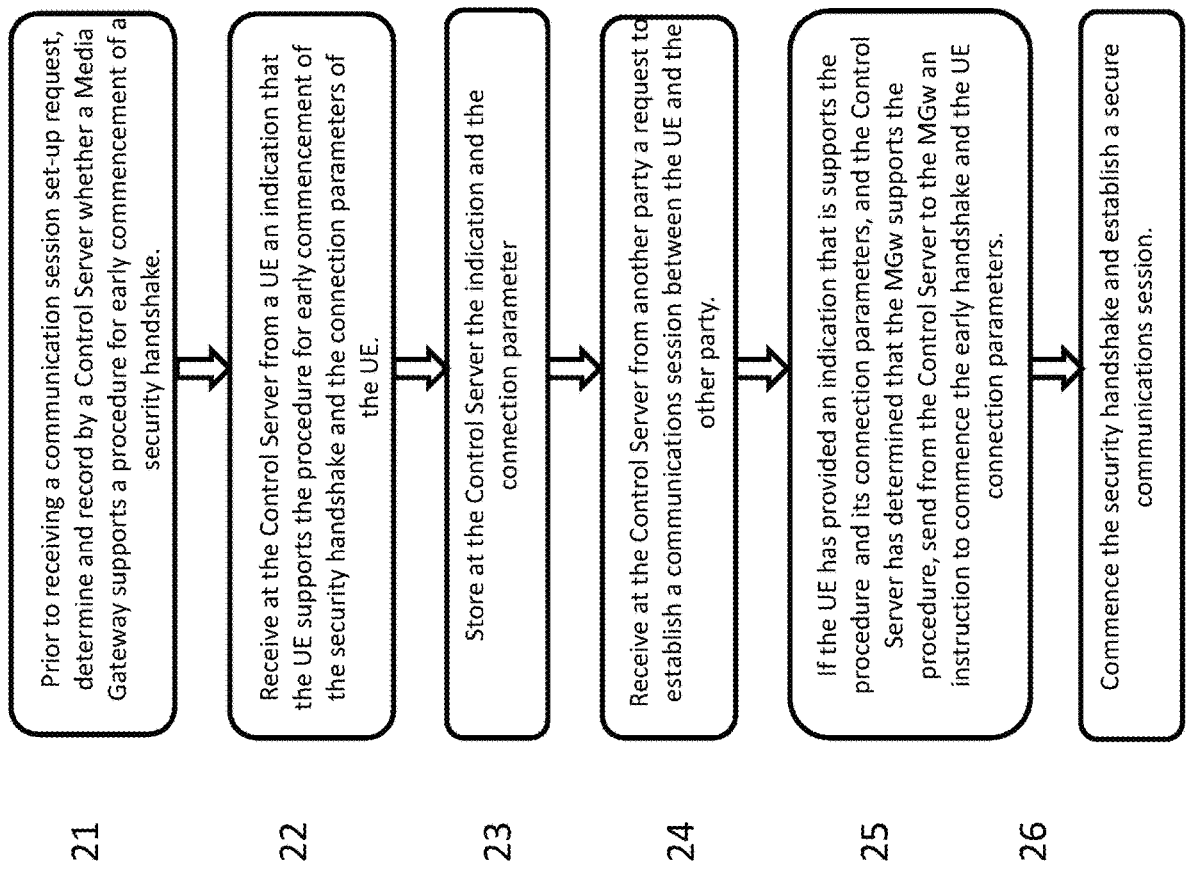
FIG. 3 is a flow diagram for a method of implementing a procedure for an early security handshake.

In order to overcome the problems with the prior art solutions, an instruction to initiate the handshake procedure between the UE and the MGw is sent immediately upon receipt of a request and the procedure is initiated immediately upon receipt of this instruction by the MGw. In order to enable this to happen, a UE provides an indication to the Control Server, prior to any request for a communication session, that it can support an early handshake procedure. At this stage also, it provides to the Control Server the connection parameters to be used for the DTLS handshake. These parameters comprise the IP address and the port numbers to be used. This step removes the need for the MGw to wait for the SDP message containing the connection parameters before it proceeds with the handshake procedure. FIG. 3 is a flow chart illustrating this method of implementing an early handshake procedure. The method begins with the determination of the capabilities of the network entities prior to any initiation of a communication session. The first step (21) comprises determination and recording as to whether an MGw controlled by the Control Server has the capability to support an early handshake procedure. The second step (22) comprises receiving from a UE an indication that the device is capable of supporting the early handshake procedure. The UE also supplies the connection parameters needed to initiate the handshake. In the third step, the indication and the connection parameters are stored (23) at the Control Server. Typically the UE supplies the indication of its capability and the connection parameters together at registration. However, the person skilled in the art will appreciate that other options are possible and that the indication and the connection parameters may be supplied separately at different times. The indication may for example be supplied at registration and the connection parameters on subsequent request by the Control Server.

Once the first two stages have been completed, the Control Server is able to respond to a communication setup request and to initiate early the handshake procedure. At the fourth step (24) such a request is received at the Control Server from a remote party wishing to establish a secure connection with the UE. Upon receipt of the communication set-up request, the control server sends an instruction (25) to the MGw along with the connection parameters for the UE. In an embodiment, this instruction is sent prior to a response to the other party. Once this instruction and the associated connection parameters have been received by the MGw, the handshake procedure is initiated (26).

Figure 4:
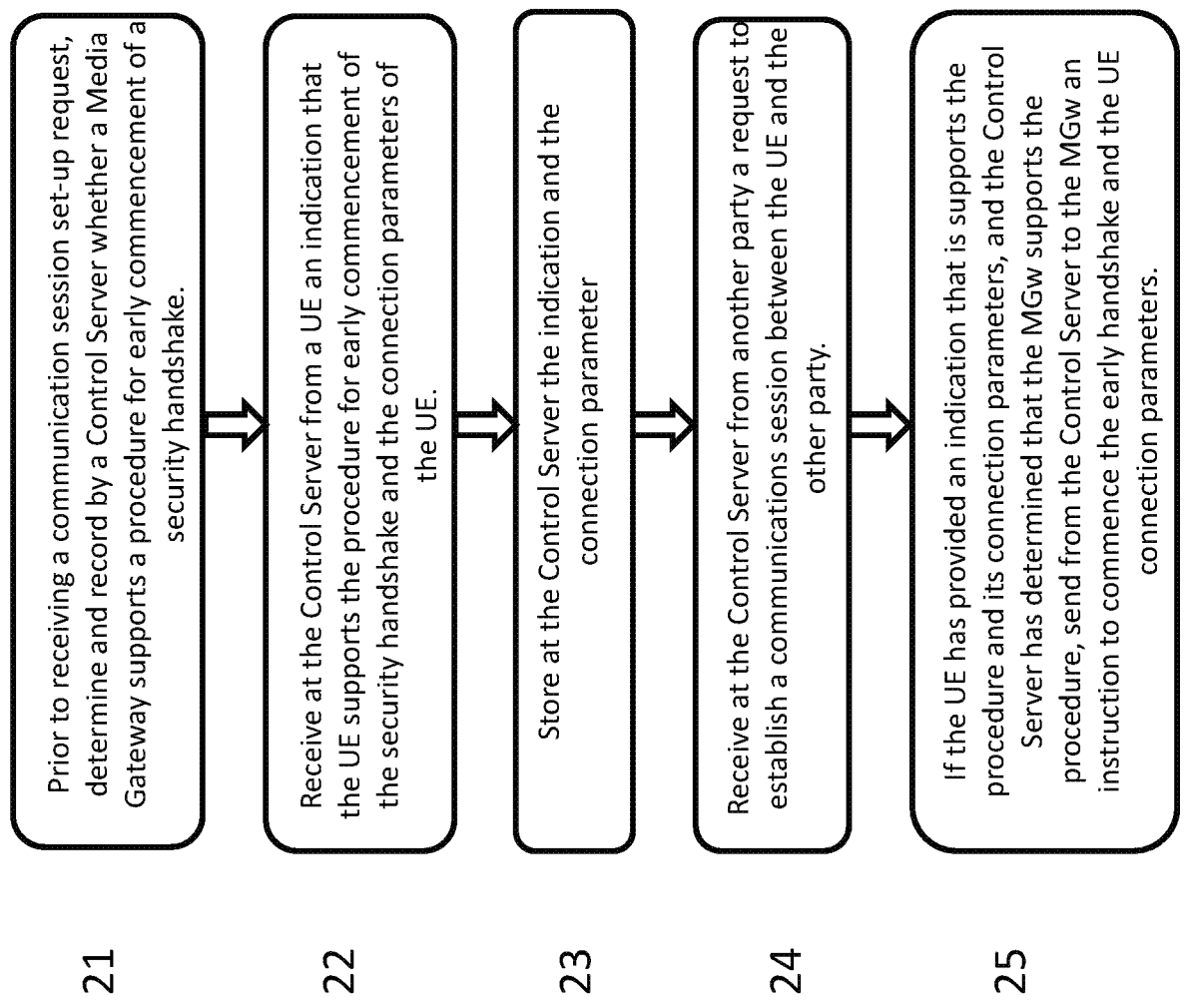
FIG. 4 is a flow diagram for a method of operating a Control Server, the method comprising a procedure for an early security handshake.

FIG. 4 is a flow chart for a method of operating a Control Server according to an embodiment. The steps (21 to 25) are the same as the first five steps for the method of FIG. 3.

Figure 5:
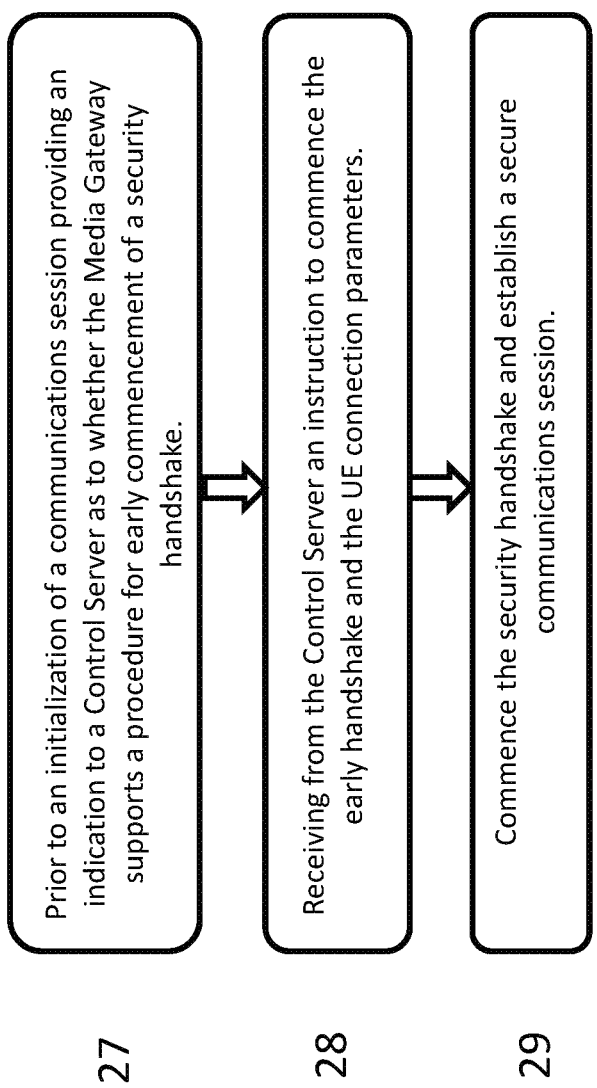
FIG. 5 is a flow diagram for a method of operating a Media Gateway (MGw), the method comprising a procedure for an early security handshake.

FIG. 5 is a flow chart for a method of operating an MGw according to an embodiment. Prior to the initialization of a communications session, the MGw provides an indication to the Control Server as to whether it supports the procedure for early handshake (27). In an embodiment this is performed in response to the Control Server sending a request to determine the MGw's capabilities. The early handshake procedure commences with the MGw receiving (28) from the Control Server an instruction to commence an early handshake accompanied by the UE connection parameters. On receipt of this information, the security handshake is commenced (29).

Figure 6:
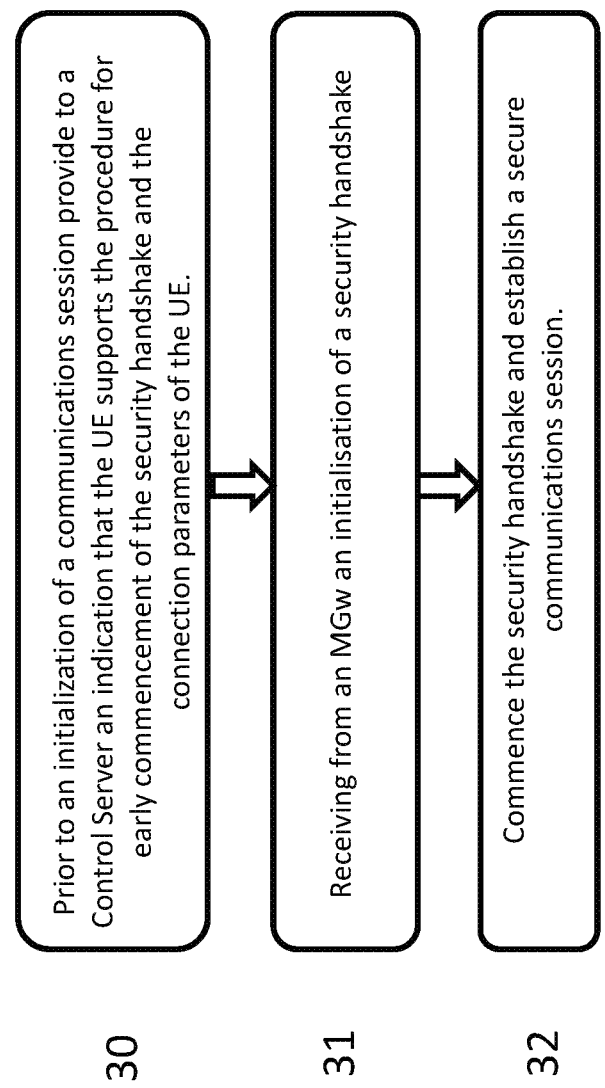
FIG. 6 is a flow diagram for a method of operating User Equipment (UE), the method comprising a procedure for an early security handshake.

FIG. 6 is a flow chart for operating a UE according to an embodiment. Prior to an initialization of a communications session the UE provides (30) to a Control Server an indication that the UE supports the procedure for early commencement of the security handshake and the connection parameters of the UE. Upon receipt (31) from an MGw an initialisation of a security handshake, the UE commences the security handshake and establishes a communications session (32).

Figure 7:
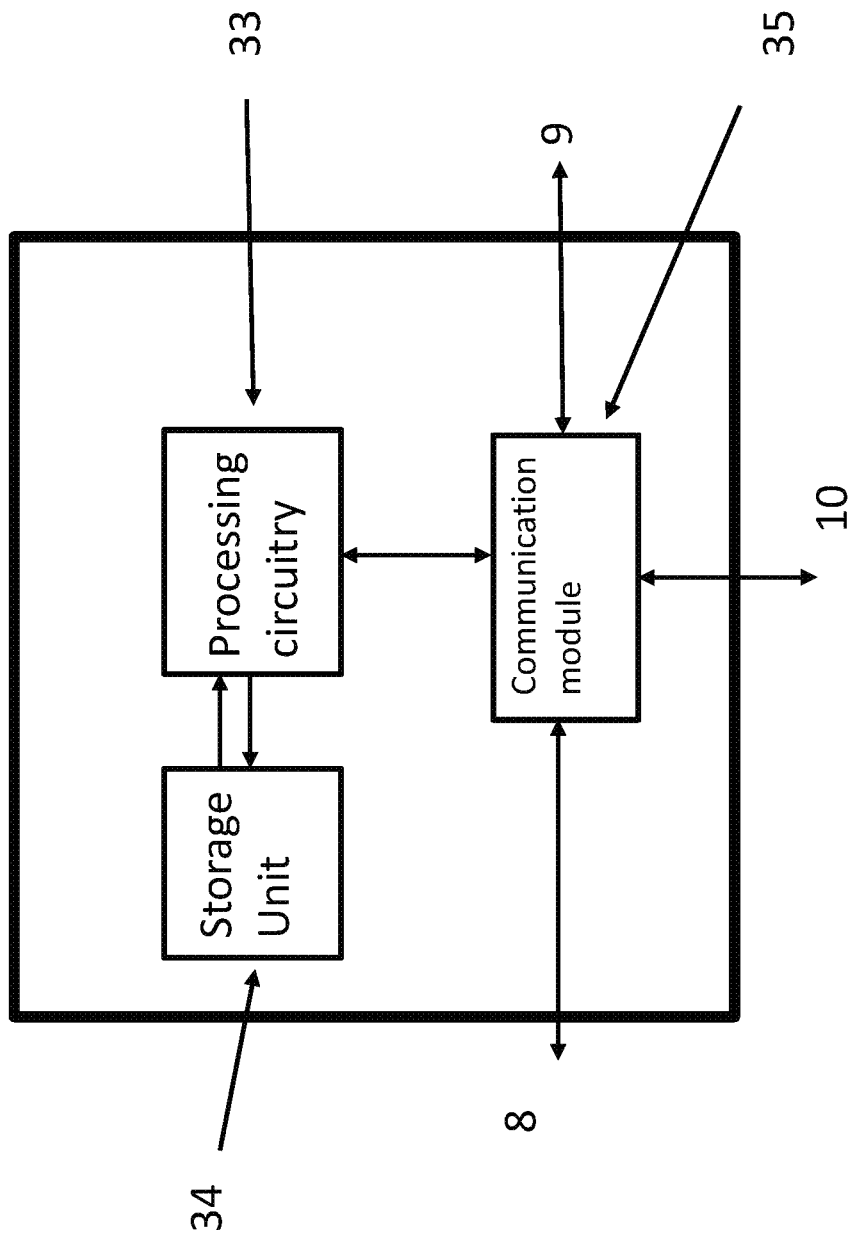
FIG. 7 is a schematic diagram of a control server configured to implement a procedure for an early security handshake.

FIG. 7 is a schematic diagram for an apparatus for use in a control server to implement the method illustrated in FIG. 4. The apparatus comprises processing circuitry (33), which interacts with one or more memory storage units (34). The apparatus additionally comprises one or more communications modules (35), which comprise a transmitter and a receiver for use with signalling links to UE's (8), the IMS core (9) and one or more MGw's (10).

Figure 8:
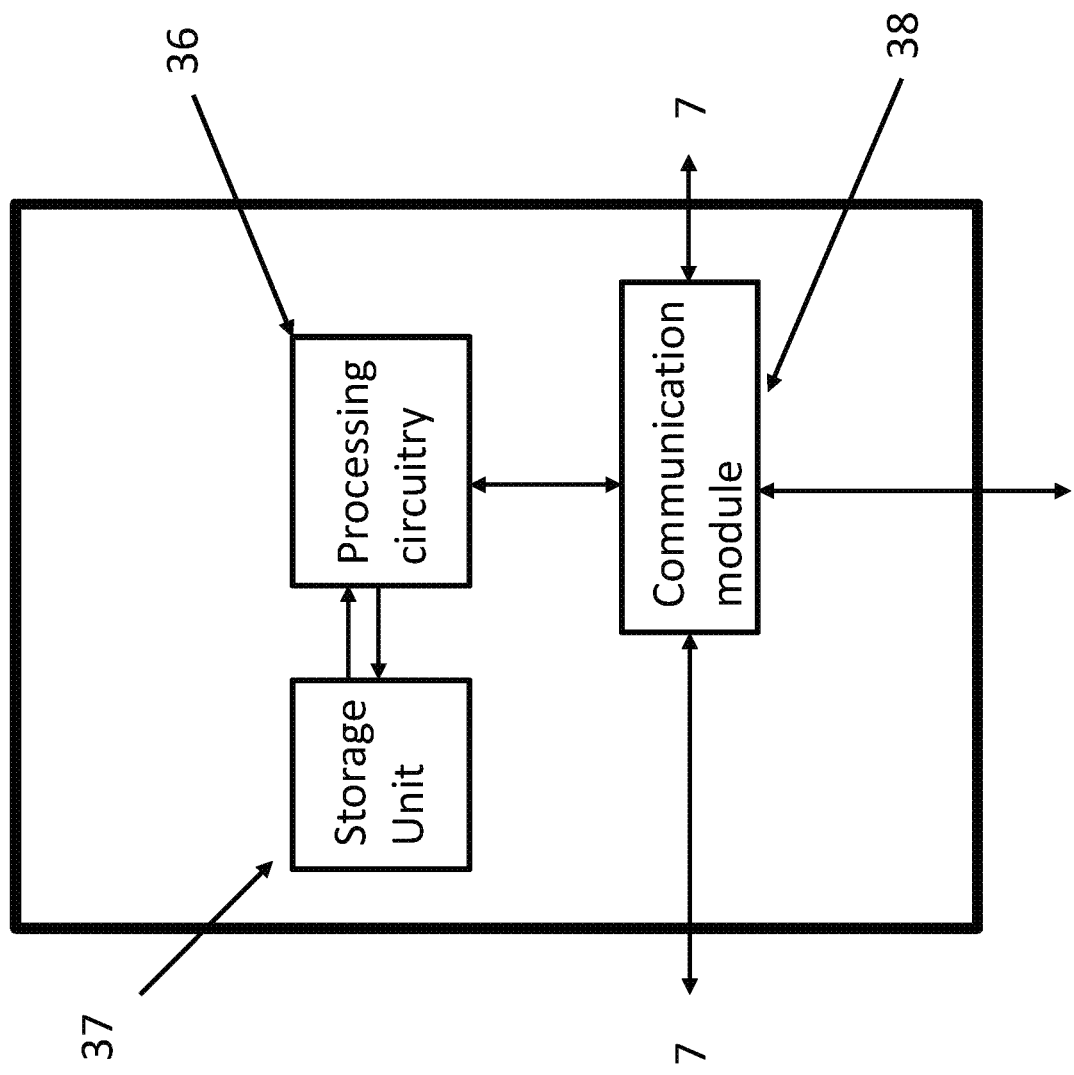
FIG. 8 is a schematic diagram of a Media Gateway (MGw) configured to implement a procedure for an early security handshake.

FIG. 8 is a schematic diagram for an apparatus for use in a Media Gateway (MGw) to implement the method illustrated in FIG. 5. The apparatus comprises processing circuitry (36), which interacts with one or more memory storage units (37). The apparatus additionally comprises one or more communications modules (38), which comprise a transmitter and a receiver for use with the media domain (7) and with a link (10) to the control server.

Figure 9:
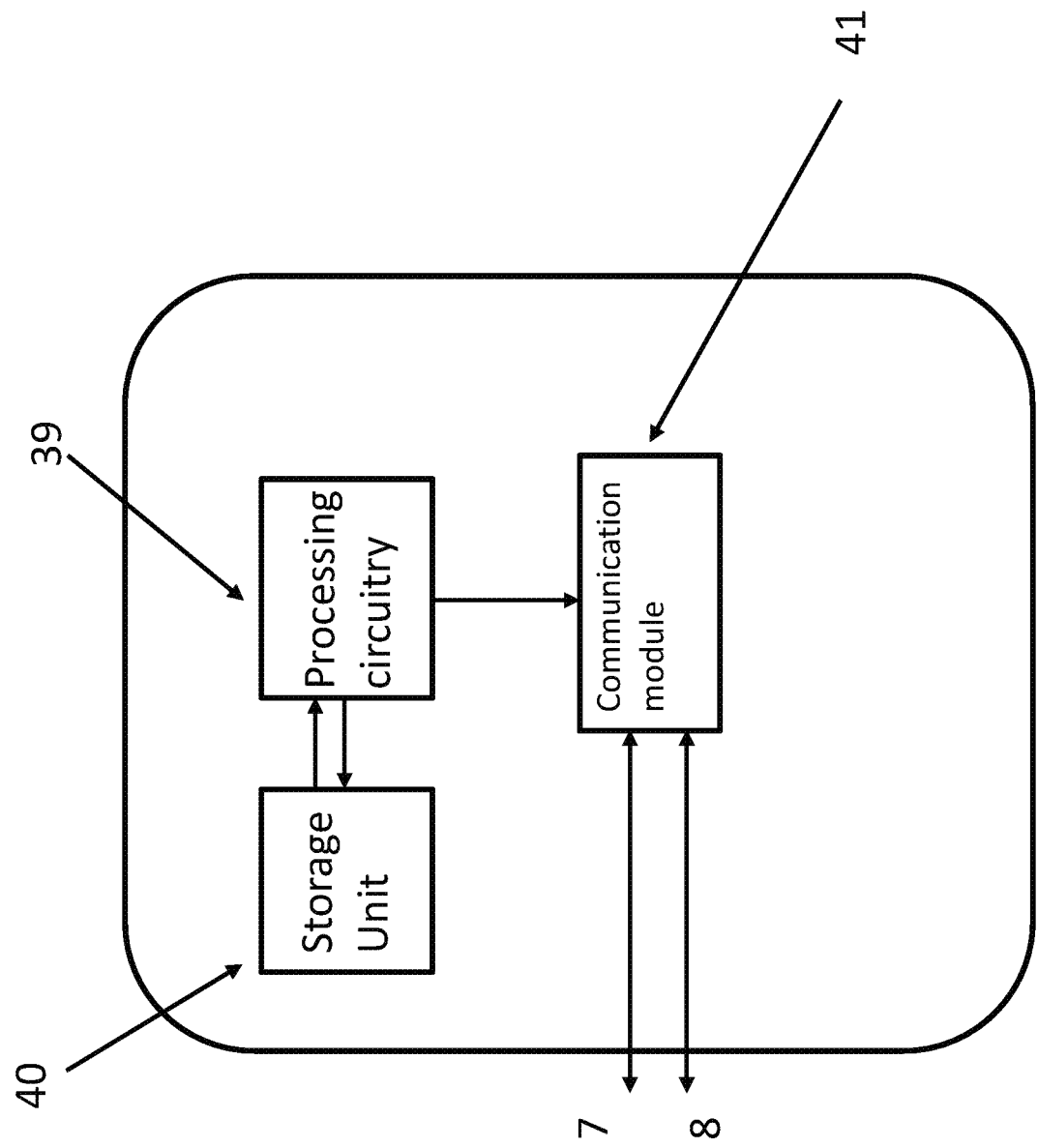
FIG. 9 is a schematic diagram of user equipment (UE) configured to implement a procedure for an early security handshake.

FIG. 9 is a schematic diagram for an apparatus for use in a UE to implement the method illustrated in FIG. 6. The apparatus comprises processing circuitry (39), which interacts with one or more memory storage units (40). The apparatus additionally comprises one or more communications modules (41), which comprise a transmitter and a receiver for communication with a network via the media domain (7) and signalling domain (8).

Figure 10:
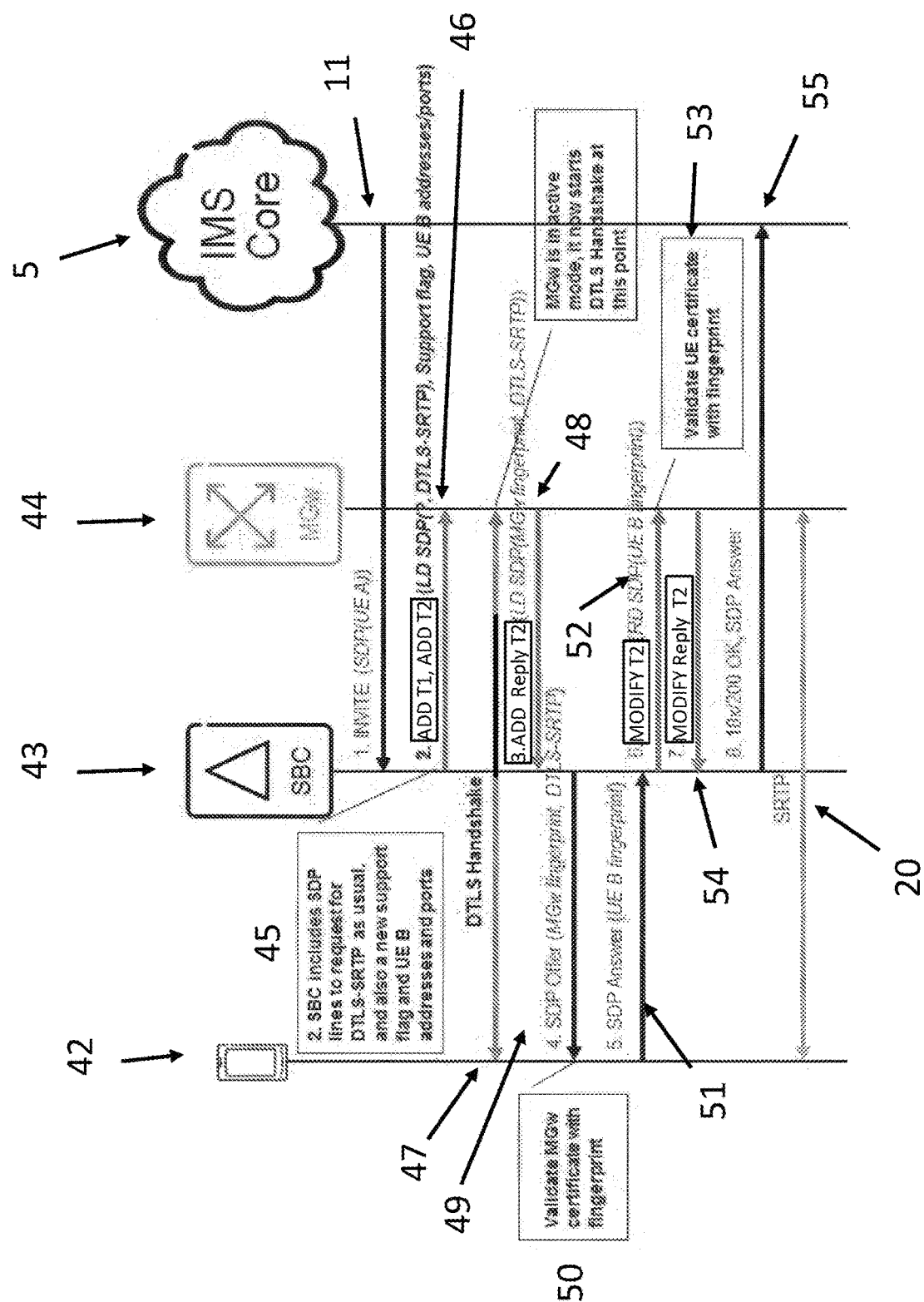
FIG. 10 is a signalling diagram for the set-up of a Secure Real Time Protocol (SRTP) based session using an early DTLS handshake.

FIG. 10 is a signalling diagram for the set-up of a Secure Real Time Protocol (SRTP) based session using an early DTLS handshake according to an embodiment. The signalling begins with a SIP INVITE message (11) from the remote user via the IMS core (5). The control server (43) determines whether both the UE (42) and the MGw (44) are capable of implementing the early handshake procedure, and, if they are, includes within an H248 ADD message the connection parameters of the UE and an instruction to the MGw to commence an early handshake procedure (45). The ADD message instructs the MGw to create two new terminations, one towards the IMS core and one towards the UE. The Add message is sent (46) to the MGw (44), which receives the instruction and initiates a DTLS handshake (47). An ADD reply message (48) which includes the fingerprint of the MGw is then sent to the Control Server. This is then passed on in SDP format (49) to the UE. The UE receives the MGw's fingerprint, and then validates (50) the MGw's certificate presented during DTLS handshake. If the certification validation fails, the UE must terminate the DTLS negotiation and the set-up of the communications session. The UE responds to the Control Server by sending its own fingerprint in SDP format (51). The Control Server forwards this fingerprint, using a MODIFY message (52). The MGw receives the UE's fingerprint in SDP format and then validates (53) the UE's certificate presented during DTLS handshake. As with the validation stage at the UE, if the certification validation fails, the MGw must terminate the DTLS negotiation and the set-up of the communication ssession. A MODIFY reply is sent (54) back to the Control Server to confirm the success of the process, whereupon a response to the remote user is sent (55) by the Control Server. After this, an SRTP session can commence (20).

Figure 11:
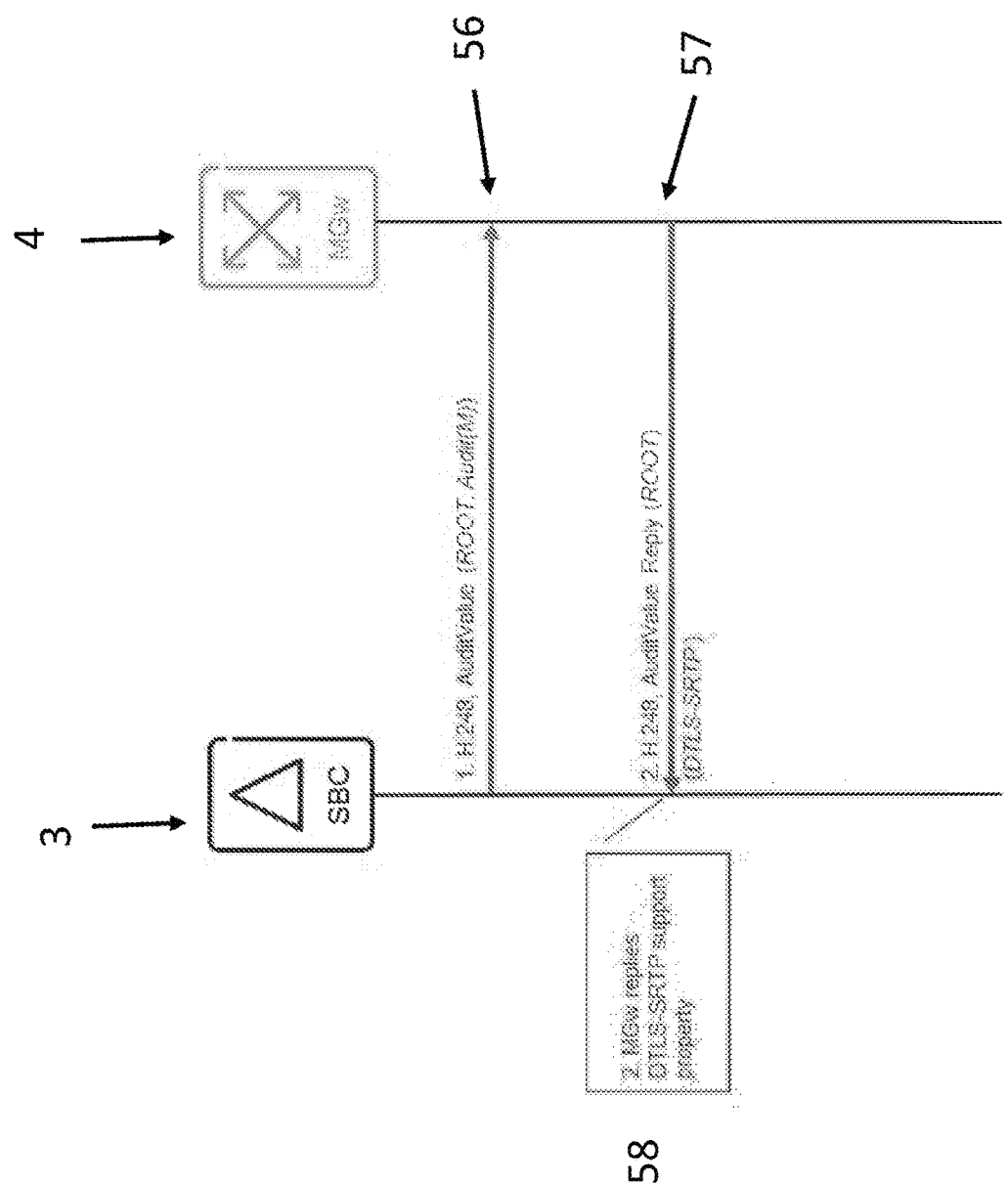
FIG. 11 is a signalling diagram for a root audit.

In order to implement the early handshake method, the control server must be aware as to whether each of the one or more MGw's it controls supports the early handshake procedure. In an embodiment of the invention this information is provided at connection or reconnection of the MGw to the Control Server. At such a connection or reconnection, the Control Server audits the root properties of the MGw. FIG. 11 is a signalling diagram for a root audit according to the prior art. In the example shown, the MGw indicates that it is capable of supporting DTLS-STRP. The signalling is a two stage process, beginning with the Control Server (3) sending an H248 AuditValuerequest (56) to the MGw (4), which responds (57) with an AuditValue response indicating that it supports DTLS-SRTP (58).

Figure 12:
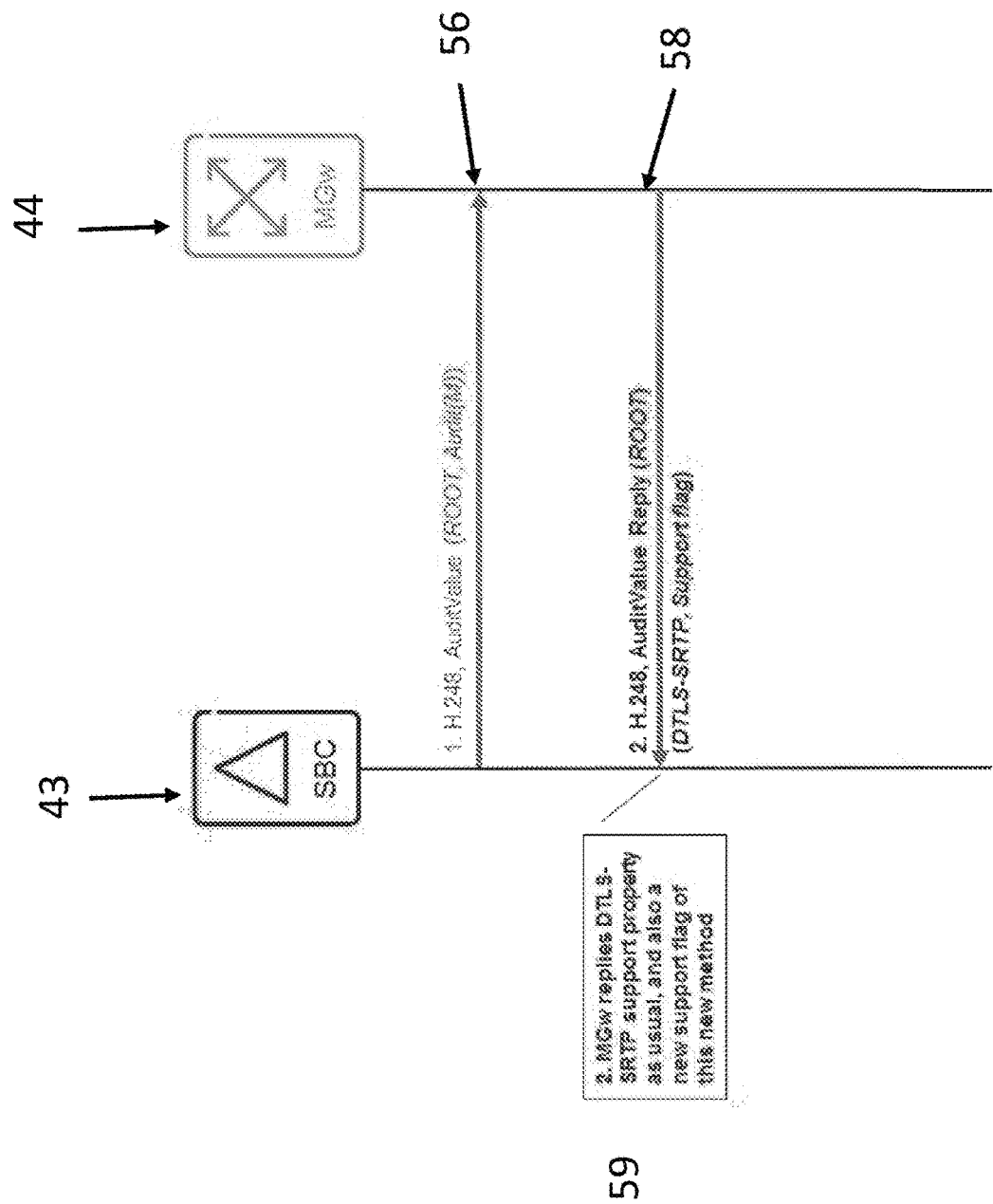
FIG. 12 is a signalling diagram for a root audit adapted to enable an instruction to indicate that the MGw is capable of implementing an early handshake procedure.

In an embodiment, the determination of whether the MGw supports an early handshake procedure is determined by use of this Root Audit procedure. The steps are shown in FIG. 12, which is a signalling diagram for a root audit adapted to enable an instruction to indicate to the Control Server (43) that the MGw (44) is capable of implementing an early handshake procedure. The same procedure is followed as for the process illustrated in FIG. 8, except that the AuditValue reply comprises an indication that the MGw has the capability of supporting an early handshake procedure (59).

Figure 13:
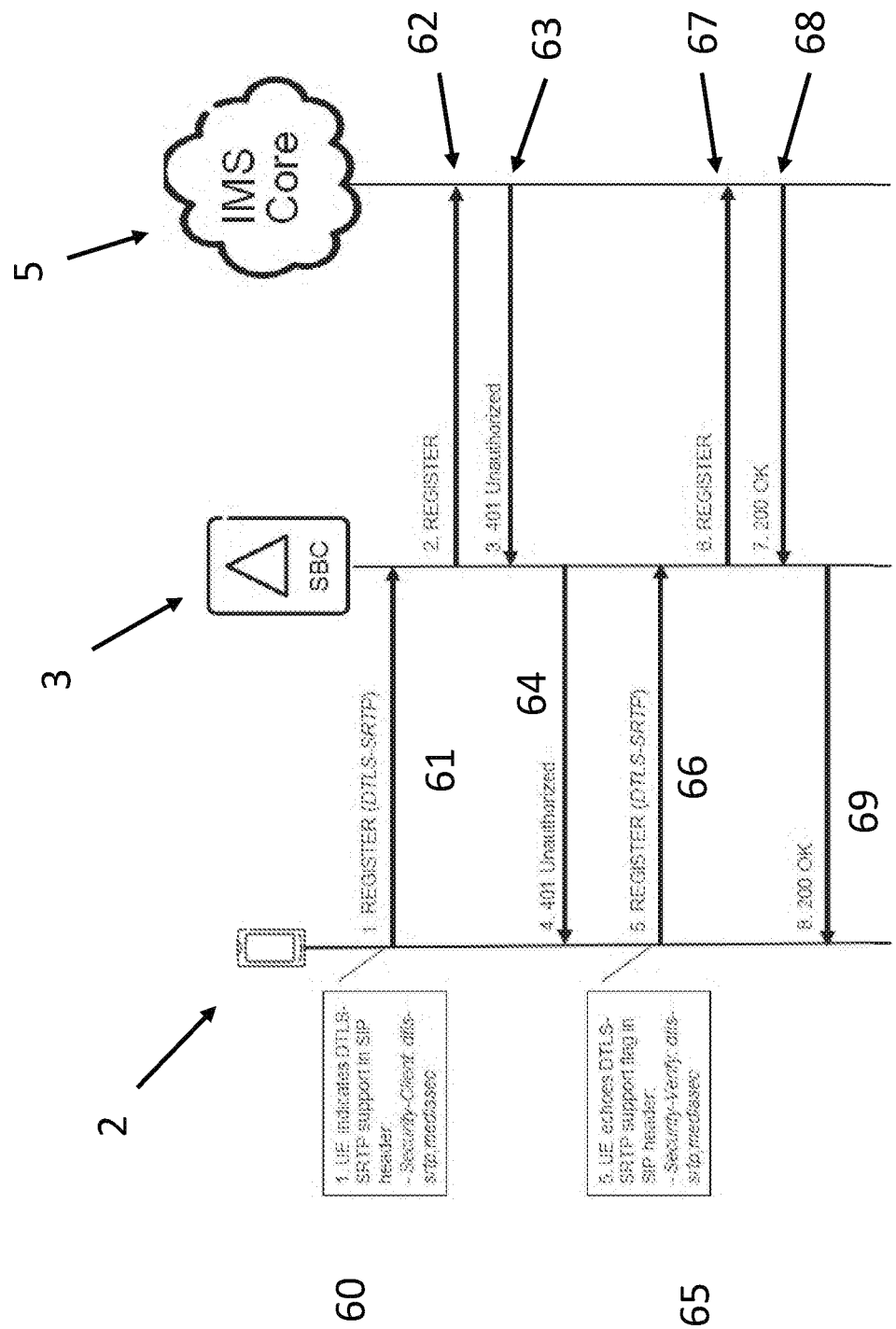
FIG. 13 is signalling diagram for a Session Initiation Protocol (SIP) REGISTER method.

In addition to knowing the capabilities of the MGw, the Control Server must also know both the capabilities of a UE and its connection parameters. In an embodiment the capability and connection parameters are sent by the UE to the Control Server at registration. This is typically performed using the SIP REGISTER method. FIG. 13 is a signalling diagram for a SIP REGISTER method according to the prior art, in which the UE (2) indicates that it is capable of supporting DTLS-SRTP. The procedure begins with the UE (2) indicating in a SIP header of a REGISTER message that it is capable of supporting DTLS-SRTP (60). The REGISTER message is then transmitted (61) to the control server (3). The control server forwards this REGISTER message to the IMS core (62). AS is standard in UE registration in SIP, an Unauthorised message is returned (63) to the control server, which then forwards this message (64) to the UE (2). A second REGISTER message (65) is now created, again with a DTLS-SRTP support flag set. This message is transmitted (66) to the control server and hence (67) to the IMS Core (5). AN OK message is returned (68) to the control server and this is then sent (69) to the UE (2), completing the process of UE registration.

Figure 14:
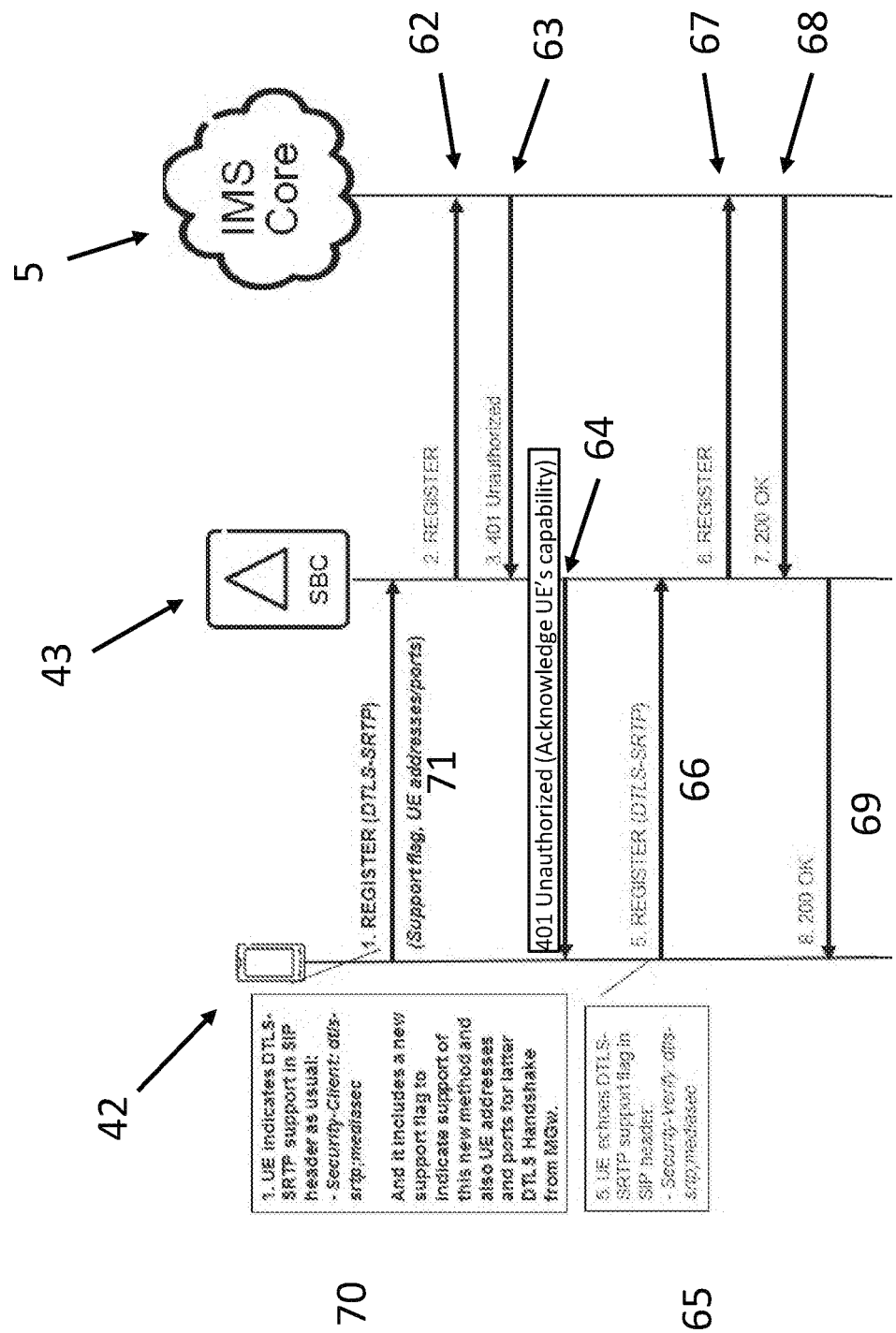
FIG. 14 is signalling diagram for a Session Initiation Protocol (SIP) REGISTER method adapted to provide an indication that the UE is capable of implementing an early handshake procedure and to supply the connection parameters for the UE.

FIG. 14 is a signalling diagram showing the registration process, except that the UE (42) now indicates its support for the early security handshake procedure. According to an embodiment, this is indicated in the header (70) of a SIP REGISTER message (71), in a similar way to the manner in which DTLS-SRTP support is indicated. This enables the indication that the message is supported and the connection parameters to be transmitted to the control server (43). After this, the REGISTER process proceeds conventionally. The person skilled in the art will appreciate that other methods of transferring the indication and the connection parameters are possible and the invention is not limited to any one way of sending the indication and parameters prior to connection setup request.

One or more embodiments as described above may enable at least one of the following technical effects:
A negotiation of security related parameters between a UE and aMGw is performed very early, before or in parallel to the media negotiation with a remote party.
A secure media connection can be established as soon as a response is received from the remote party and by this shortening the session set-up time.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claim is:

1. A method of establishing a communication session between a User Equipment (UE) and another party by way of a Media Gateway (MGw) controlled by a Control Server, the communication session comprising a secure connection between the UE and the MGw, wherein the setup of the secure connection comprises a security handshake procedure, the method comprising:
  prior to receiving a communication session setup request at the Control server:
    determining, by the Control Server, that the MGw supports a procedure for early commencement of the security handshake;
    providing, by the UE and to the Control Server, an indication that the UE supports the procedure for early commencement of the security handshake procedure and connection parameters for use in the security handshake; and
    storing the indication and the connection parameters at the Control Server;
  in response to the Control Server receiving a communication session setup request from the another party, when the UE has provided the indication that the UE supports the procedure and connection parameters, and the Control Server has determined that the MGw supports the procedure:
    sending an instruction, from the Control Server to the MGw, to commence the security handshake procedure, the instruction comprising the connection parameters for the UE;
    commencing the handshake procedure to setup a secure communication session; and
    completing the establishing of the communication session.

2. The method of claim 1, wherein the security handshake comprises an exchange of authentication certificates between the UE and the MGw; wherein the method further comprises:
    tentative acceptance of the authentication certificates during the handshake procedure; and
    after the commencement of the security handshake procedure:
        exchanging, between the UE and the MGw, respective fingerprints derived from the respective authentication certificates; and
        validating the respective authentication certificates, by the UE and the MGw, using the respective fingerprints.

3. The method of claim 2, wherein the setup of the communication session is terminated when the validating the respective authentication certificates by the UE or the MGw using the respective fingerprints fails.

4. A User Equipment (UE) in a communications network having a Control Server, the UE comprising:
    processing circuitry;
    memory containing instructions executable by the processing circuitry whereby the UE is operative to:
        prior to receiving a communication session setup request, provide, to the Control Server, an indication that the UE supports a procedure for early commencement of a security handshake and connection parameters for use in the security handshake; and
        in response to receiving, from a Media Gateway (MGw), an initialization of the security handshake:
            commence the security handshake; and
            establish a secure communication session.

5. The UE of claim 4, wherein the instructions are such that the UE is configured to:
    tentatively accept a security certificate from the MGw during the handshake; and
    then perform a validation to confirm the certificate upon receipt of a fingerprint derived from the certificate.

6. The UE of claim 5, wherein the instructions are such that the UE is configured to terminate the setup of the communication session when the validation is unsuccessful.

7. The UE of claim 4, wherein the instructions are such that the UE is configured to provide the indication and the connection parameters in a registration procedure.

8. A Control Server for a Media Gateway (MGw) in a communications network, the Control Server comprising:
    processing circuitry;
    memory containing instructions executable by the processing circuitry whereby the Control Server is operative to:
        prior to receiving a communication session setup request:
            determine and record that an MGw supports a procedure for early commencement of a security handshake;
            receive, from a User Equipment (UE), an indication that the UE supports the procedure for early commencement of the security handshake and connection parameters for use in the security handshake; and
            store the indication and the connection parameters;
        in response to receiving the communication session setup request from another party, when the UE has provided the indication that the UE supports the procedure and the connection parameters, and the Control Server has determined that the MGw supports the procedure:
            send, to the MGw, the connection parameters of the UE and an instruction to commence the handshake procedure.

9. The Control Server of claim 8, wherein the instructions are such that the Control Server is configured to:
    receive the indication from the UE and the connection parameters at a registration of the UE, and
    provide an acknowledgement to the UE.

10. A Media Gateway (MGw) in a communications network, the MGw comprising:
    processing circuitry;
    memory containing instructions executable by the processing circuitry whereby the MGw is operative to:
        prior to an initialization of a communication session, provide an indication to a Control Server that the MGw supports a procedure for early commencement of a security handshake; and
        in response to receiving an instruction from the Control Server and connection parameters for a User Equipment (UE), commence the early handshake procedure with the UE using the provided connection parameters.

11. The MGw of claim 10, wherein the instructions are such that the MGw is configured to:
    tentatively accept an authentication certificate of the UE during the handshake procedure; and
    perform a validation of the certificate upon receipt, from the Control Server, of a fingerprint derived from the certificate.

12. The MGw of claim 11, wherein the instructions are such that the MGw is configured to terminate the set-up of the communication session when the validation fails.

13. A method of operating a User Equipment (UE), comprising:
    prior to receiving a communication session set-up request, provide, to a Control Server, an indication that the UE supports a procedure for early commencement of a security handshake and connection parameters for use in the security handshake;
    in response to receiving, from a Media Gateway (MGw), an initialization of a security handshake:
        commence the security handshake; and
        establish a secure communication session.

14. The method of claim 13, further comprising:
    tentatively accepting a security certificate from an MGw during the handshake; and
    then performing a validation to confirm the certificate upon receipt of a fingerprint derived from the certificate.

15. The method of claim 14, further comprising terminating the setup of the communication session if the validation is unsuccessful.

16. The method of claim 14, wherein the indication and the connection parameters are provided in a registration procedure.

17. A method of operating a Media Gateway (MGw) in a communications network, the communications network comprising the MGw, a User Equipment (UE), and a Control Server, the method comprising:
- prior to an initialization of a communication session, providing an indication to the Control Server that the MGw supports a procedure for early commencement of a security handshake; and
- in response to receiving an instruction from the Control Server and connection parameters for a UE, commencing the early handshake procedure with the UE using the provided connection parameters.

18. The method of claim 17, further comprising:
- tentatively accepting an authentication certificate of the UE during the handshake procedure; and
- performing a validation of the certificate upon receipt, from the Control Server, of a fingerprint derived from the certificate.

19. The method of claim 18, further comprising terminating the setup of the communication session when the validation fails.

20. A method of operating a Control Server in a communications network, the communications network comprising a Media Gateway (MGw), a User Equipment (UE), and a Control Server, the method comprising the Control Server:
- prior to receiving a setup request to establish a communication session at the Control Server:
  - determining that the MGw supports a procedure for early commencement of a security handshake;
  - receiving, from the UE, an indication that the UE supports the procedure for early commencement of the security handshake procedure and connection parameters for use in the security handshake; and
  - storing the indication and the connection parameters;
- in response to receiving a setup request to establish a communication session from another party and when both the UE and the MGw support the procedure for early commencement of the security handshake procedure, sending an instruction from the Control Server to the MGw to commence the security handshake procedure, the instruction comprising the connection parameters for the UE.

* * * * *